United States Patent
Vincenti

(10) Patent No.: US 7,118,168 B2
(45) Date of Patent: Oct. 10, 2006

(54) MOTOR VEHICLE CHASSIS

(75) Inventor: Richard Vincenti, Evette Salbert (FR)

(73) Assignee: Peugeot Citroen Automobiles SA, Velizy-Villacoublay (FR)

(*) Notice: Subject to any disclaimer, the term of this patent is extended or adjusted under 35 U.S.C. 154(b) by 2 days.

(21) Appl. No.: 10/489,360

(22) PCT Filed: Sep. 12, 2002

(86) PCT No.: PCT/FR02/03111

§ 371 (c)(1),
(2), (4) Date: Dec. 21, 2004

(87) PCT Pub. No.: WO03/022661

PCT Pub. Date: Mar. 20, 2003

(65) Prior Publication Data

US 2005/0104356 A1     May 19, 2005

(30) Foreign Application Priority Data

Sep. 13, 2001 (FR) .................................. 01 11846

(51) Int. Cl.
*B62D 25/20* (2006.01)
(52) U.S. Cl. ............. 296/203.04; 296/204; 296/193.07
(58) Field of Classification Search .......... 296/203.04, 296/204, 181.4, 186, 193.07
See application file for complete search history.

(56) References Cited

U.S. PATENT DOCUMENTS

| | | | |
|---|---|---|---|
| 4,068,884 A * | 1/1978 | Watanabe et al. ........... 296/204 |
| 4,836,600 A * | 6/1989 | Miyazaki et al. ...... 296/193.07 |
| 4,865,378 A * | 9/1989 | Filtri et al. ............ 296/193.07 |
| 5,018,780 A * | 5/1991 | Yoshii et al. .......... 296/203.04 |
| 5,549,349 A | 8/1996 | Corporon et al. |
| 5,580,121 A * | 12/1996 | Dange et al. ............. 296/181.4 |
| 5,788,322 A * | 8/1998 | Wolf et al. ............... 296/181.4 |
| 6,168,228 B1 * | 1/2001 | Heinz et al. ........... 296/187.12 |
| 6,234,568 B1 * | 5/2001 | Aoki ..................... 296/203.04 |
| 6,595,581 B1 * | 7/2003 | Wolkersdorfer et al. .... 296/204 |

FOREIGN PATENT DOCUMENTS

EP      1 097 857      5/2001

* cited by examiner

Primary Examiner—Dennis H. Pedder
(74) Attorney, Agent, or Firm—Nicolas E. Seckel

(57) ABSTRACT

A chassis for a motor vehicle comprises two lateral longitudinal members. The following elements extend between these members and are affixed to them: the front and rear floor parts; a cross member known as the heel board cross member having upper and lower longitudinal sides which are fixed to the front and rear floor parts, respectively; and a cross member, having a length approximately equal to that of the heel board cross member, which extends underneath the lower longitudinal side of the heel board cross member and is affixed to it. Each of the ends of the cross member is fixed to one of the lateral longitudinal members. The invention also relates to station wagon-type motor vehicle having such a chassis.

18 Claims, 3 Drawing Sheets

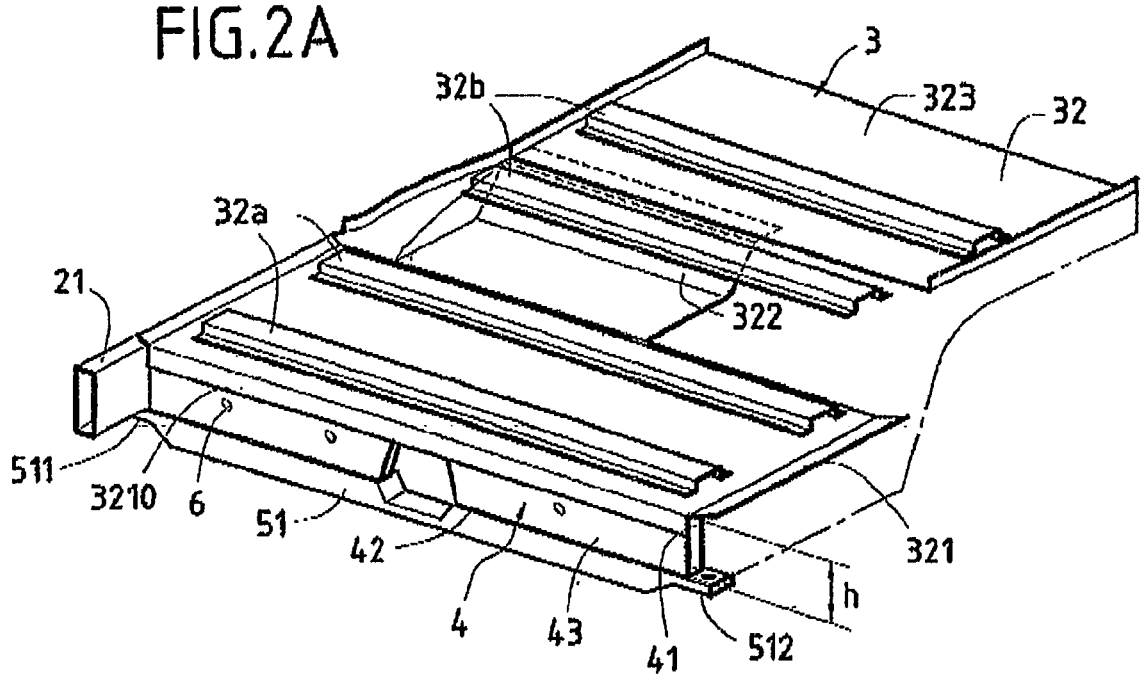
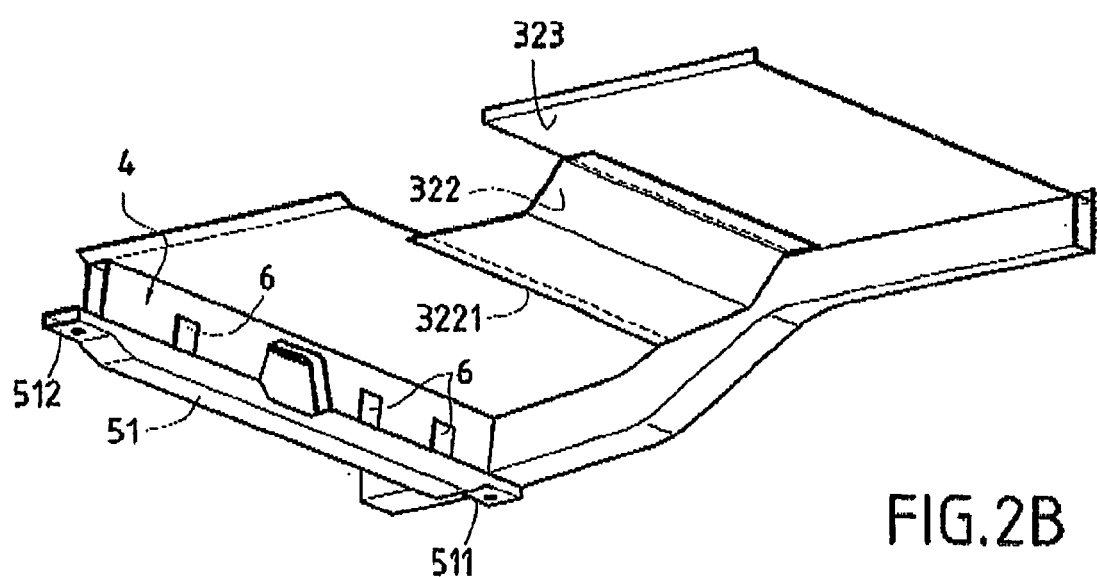

MOTOR VEHICLE CHASSIS

The present invention relates to a motor vehicle chassis comprising two lateral longitudinal members between which extend transversely and to which are affixed the front floor part, the rear floor part, a cross member called "heel board" cross member whose upper and lower longitudinal sides are affixed to the front floor part and the rear floor part, respectively, and means for stiffening the heel board cross member.

Numerous recent developments concerning the interior design of the passenger compartment of a motor vehicle have led to improving the arrangement of the various elements, such as the seats, relative to each other, as well as their mobility, with a view toward increasing the available space as desired. Thus, in the vehicles of the type "station wagon" in which it has been desired to provide seven seatings, various improvements have consisted in designing rear seats that are partly collapsible, in providing seats of the foldaway type at the rear of the vehicle, preferably completely removable from the passenger compartment.

An interesting improvement for vehicles of this type would be to propose a vehicle with seven individual seatings whose five rear seats would be obtained as two rows of modular individual seats without changing the known dimensions for station wagon vehicles. To this effect, it appears absolutely necessary to have a chassis with a floor that is as flat as possible. Indeed, the present design of the chassis in vehicles of the station wagon type does not make it possible to fit individual seats at the rear of the vehicle because the available height is insufficient.

The goal of the invention is thus to propose a motor vehicle chassis that makes it possible to provide a vehicle of the "station wagon" type with seven individual seatings, among which five rear seatings would be obtained in two rows of modular individual seats.

To this effect, an object of the invention is a motor vehicle chassis comprising two lateral longitudinal members between which extend transversely and to which are affixed the front floor pan, the rear floor pan, a cross member called "heel board" cross member, whose upper and lower longitudinal sides are affixed to the front and rear floor parts, respectively, and means for stiffening the heel board cross member, remarkable in that the stiffening means are constituted by a cross member having a length approximately equal to that of the heel board cross member, which extends underneath the lower longitudinal side thereof, and is affixed thereto, and each of whose ends is affixed to one of the lateral longitudinal members.

The solution according to the invention, which makes it possible to reach the desired objective very easily, is far from being obvious. Indeed, the person of the art who tries to obtain directly a floor as flat as possible in a vehicle of the station wagon type first thinks about removing the part having an important height that is located over the heel board cross member. However, removing this part called "heel board stiffener" results in considerably reducing the rigidity of the floor. This reduction in rigidity first results in local sagging of the floor when a passenger would take place in a rear seat. Next, when the motor vehicle is no longer stationary, the floor is subjected to variations in the forces applied to the seat as a function of the road profile, the decelerations and accelerations of the vehicle. This results in a phenomenon called pumping of the floor as well as in vibrations of the frame which are highly detrimental to the vibratory comfort for the passengers.

Thus, the person of the art, faced with these technical difficulties, would rather seek to redefine the architecture of the chassis and of the floor associated thereto.

On the contrary, the inventors have managed to judiciously establish that the implantation of a cross member underneath the heel board cross member would make it possible to obtain the desired additional rigidity, thus eliminating any "pumping" phenomenon and reducing the vibratory nuisance mentioned above. In addition, it enables an increased loading capacity of the station wagon vehicle, object of the invention, when the individual rear seats are completely removed.

Advantageously, the stiffening cross member is constituted by two elements assembled together so as to form a hollow body.

Preferably, the two elements are in stamped sheet metal and are assembled together by welding.

Preferably, moreover, the cross member has at least one cutout adapted to ensure the passage of at least one element, such as an exhaust pipe, between the said cross member and the floor.

According to a preferred embodiment of the invention, the means for fixing the stiffening cross member to the lower longitudinal side of the heel board cross member and to the lateral longitudinal members, respectively, are removable.

According to this embodiment, the means for fixing the stiffening cross member to the lower longitudinal side of the heel board cross member are screws or angle brackets.

Advantageously and according to the invention, the rear floor part comprises a panel, affixed to the upper longitudinal side of the heel board cross member and on which is affixed a first cross member supporting the front of seat slides, and at least one load panel, on which is affixed a second cross member supporting the rear of the seat slides.

The invention also relates to a motor vehicle of the station wagon type comprising a chassis as described above.

Other advantages and characteristics of the invention will be further understood by reading the detailed description made in reference to the following figures in which:

FIGS. 2a and 2b are a front view and a rear view in perspective of a portion of a chassis of a motor vehicle according to the invention;

Figure 1A:
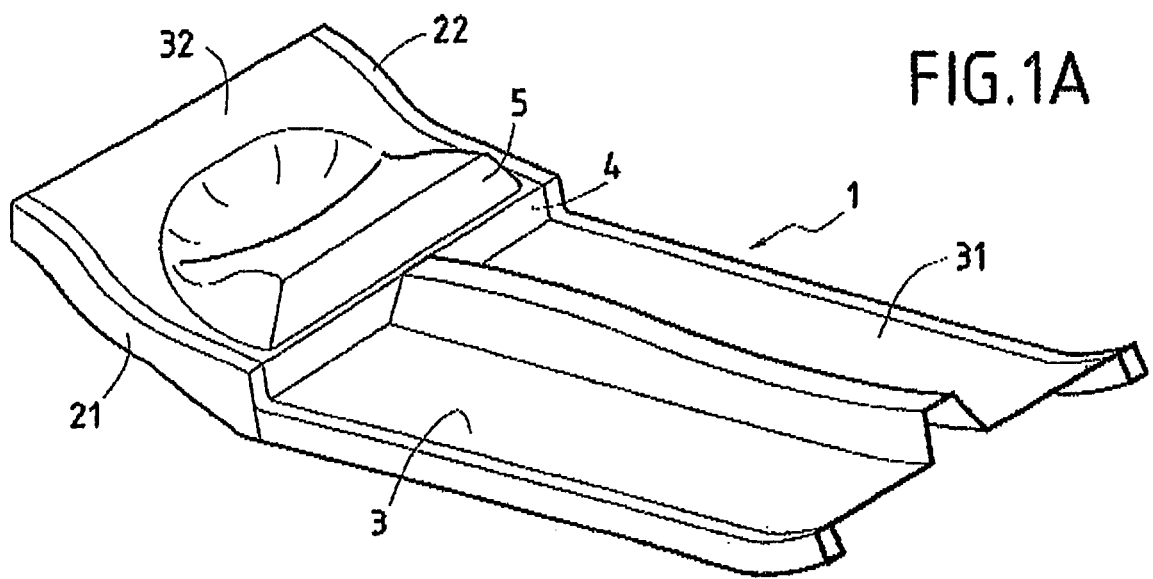
FIGS. 1a and 1b are a perspective view and a cross-section view of a portion of a chassis of a motor vehicle according to the state of the art.
Figure 1B:
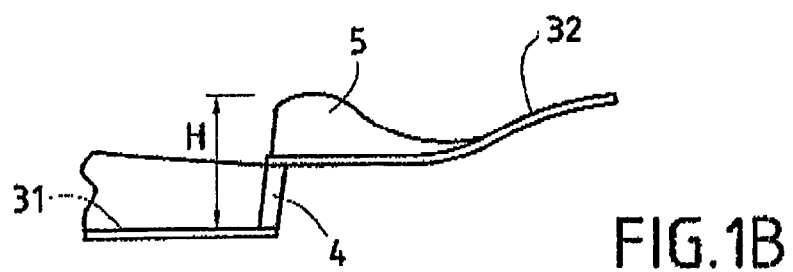

FIGS. 1a and 1b show a portion of a chassis 1 of a motor vehicle according to the state of the art. This chassis 1 comprises, first, two identical lateral longitudinal members 21, 22 which extend along the longitudinal axis of the vehicle.

A floor 3 extends between these two longitudinal members 21, 22 and is affixed thereto. This floor comprises a front part 31 and a rear part 32 connected to each other by a cross member 4 called "heel board cross member" through welding which is not shown.

Each of the two ends of this "heel board" cross member 4 is itself welded to one of the longitudinal members 21, 22.

The rear portion 32 of the floor comprises, in the vicinity of the heel board cross member 4, a stiffener 5 made of sheet metal whose shape and thickness make it possible to stiffen it sufficiently.

On FIG. 1a, it is visible that, in order to ensure a sufficient stiffening of the heel board cross member 4, the sheet metal stiffener 5 must have an important height, so that the difference H in height existing between the front part 31 of the floor and the top of the stiffener 4 is also important, usually in the order of 250 mm to 300 mm.

A portion of a chassis 1 of a motor vehicle of the "station wagon" type according to the invention is shown in FIGS. 2a and 2b. The rear part 32 of the floor 3 according to the invention comprises a rear panel 321 whose front longitudinal side 3210 is welded to the upper longitudinal side 41 of the heel board cross member 4. On this rear panel 321 is affixed a first pair of supports 32a for seat slides adapted to receive modular individual seats.

The rear portion 32 of the floor 3 according to the invention also comprises two load panels 322, 323 welded to each other along one of their longitudinal sides, one of these load panels 322 being itself welded through its front longitudinal side 3221 to the rear longitudinal side of the rear panel 321 described above. On each of these load panels is affixed a slide support constituting a second pair of supports 32b for seat slides adapted to receive modular individual seats also.

Figure 3:
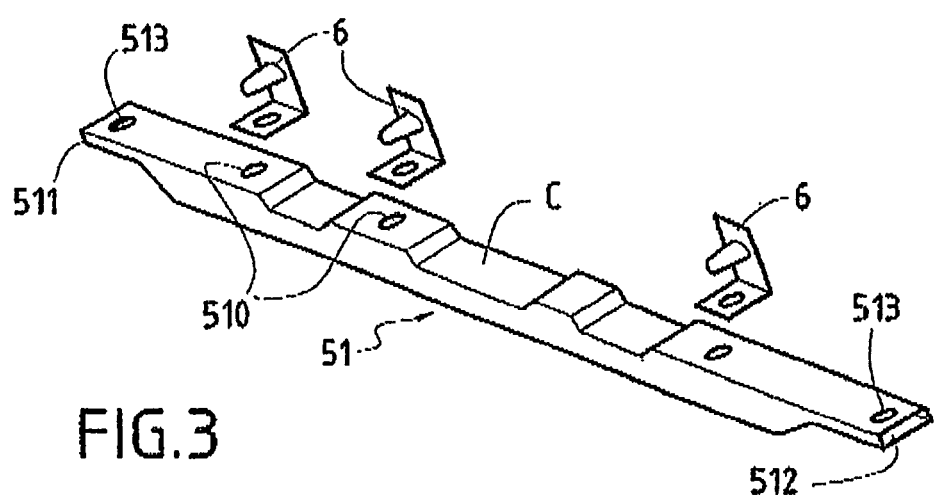
FIG. 3 is a perspective view of a cross member according to the invention.
Figure 4:
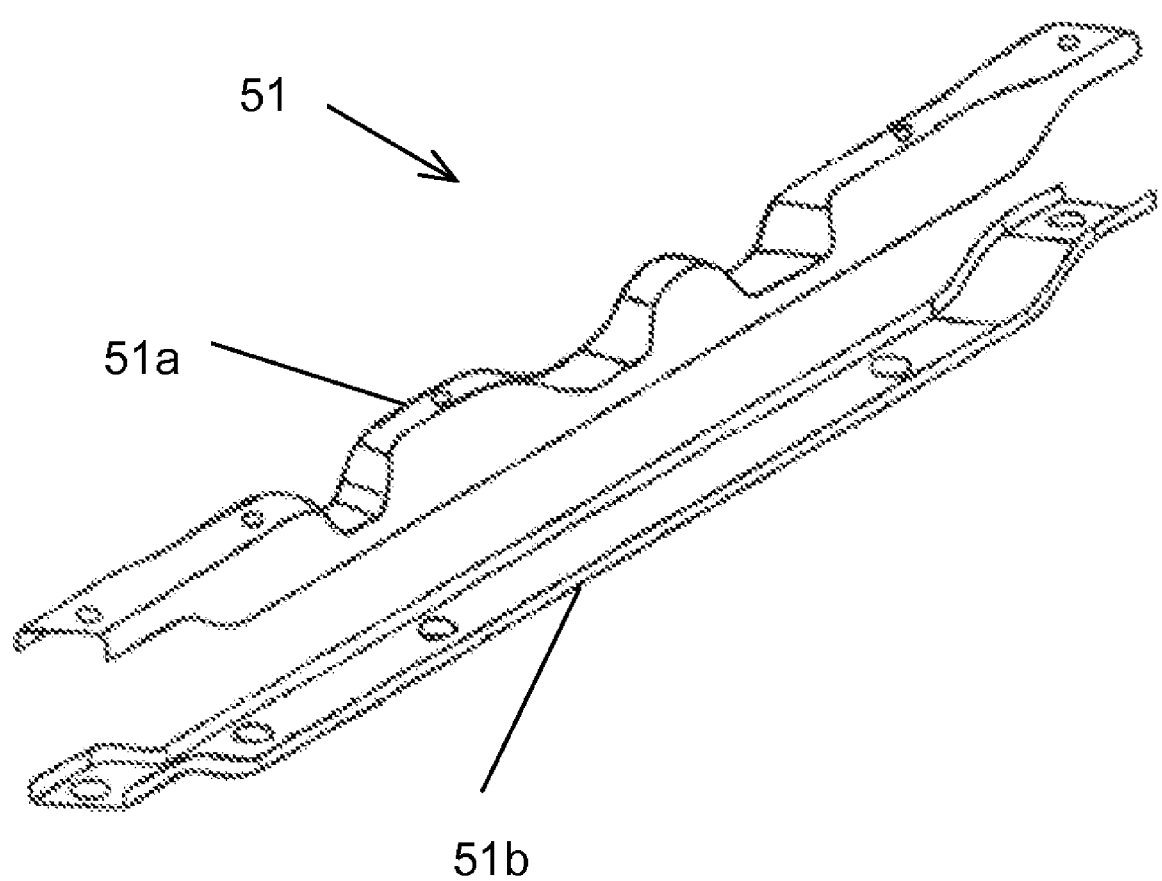
FIG. 4 is another perspective view of the cross member according to the invention.

A stiffening cross member 51, shown in FIG. 3, having a length approximately equal to that of the heel board cross member 4, extends underneath the lower longitudinal side 42 thereof and is affixed thereto through removable angle brackets 6 disposed in bores 510. Each of the ends 511, 512 of this cross member 51 is affixed to one of the lateral longitudinal members 21, 22, respectively, through screws that are not shown disposed in bores 513 provided to this effect.

This stiffening cross member 51 is constituted by two plates 51a and 51b in stamped sheet metal which are assembled together by welding to form a hollow body.

The hollow body thus formed has in its middle portion a cutout (C) enabling the passage of an exhaust line of the motor vehicle.

The rigidity of this hollow body is adapted to eliminate any pumping phenomenon that would be likely to occur otherwise, on the one hand, and to reduce to a minimum the mechanical noises and vibrations that would be likely to propagate in the area of the heel board cross member 4, on the other hand.

With such a stiffening cross member, the floor 3 of the vehicle is approximately flat over its whole length. Thus, the difference h in height existing between the front part of the floor 31 and the rear panel 321 is small, in the order of 150 mm.

The invention that has been described above makes it possible to obtain a motor vehicle of the "station wagon" type with a floor as flat as possible and in which it is possible to provide seven modular individual seats. In addition, according to another important aspect of the invention, the stiffening cross member which is removable and provided without considerable modification of the vehicle architecture makes it possible to maintain the base thereof, in the variant whereby the vehicle to be manufactured is a vehicle of the sedan or minivan type. Indeed, in such a variant, the stiffening cross member 51 will be completely removed from the chassis according to the invention and it will be possible to provide stiffening means known in themselves inside the body, this being made possible by the lack of additional row of rear seats (vehicle of the sedan type) or by the height of the passenger compartment (vehicle of the minivan type).

Of course, it is self-evident that other modifications and improvements may be made without leaving the scope of the invention. For example, the constituting material and the dimensions of the stiffening cross member may be easily adapted as a function of the manufacturing requirements and of the vehicle architecture.

The invention claimed is:

1. Motor vehicle chassis comprising two lateral longitudinal members between which extend transversely, and to which are affixed, a front floor part, a rear floor part, a cross member called "heel board" cross member, whose upper and lower longitudinal sides are affixed to the front and rear floor parts, respectively, and means for stiffening the heel board cross member, wherein the stiffening means comprise a cross member, having a length approximately equal to that of the heel board cross member, said stiffening cross member is located substantially underneath the lower longitudinal side thereof and is removably affixed thereto, and each of whose ends is affixed to one of the lateral longitudinal members.

2. Chassis according to claim 1, wherein the stiffening cross member is constituted by two elements assembled together so as to form a hollow body.

3. Chassis according to claim 2, wherein the two elements are in stamped sheet metal and are assembled together by welding.

4. Chassis according to claim 1, wherein the cross member has at least one recess adapted to ensure the passage of at least one element, between said cross member and the floor.

5. Chassis according to claim 1, wherein the means for fixing the stiffening cross member to the lower longitudinal side of the heel board cross member and to the lateral longitudinal members, respectively, are removable.

6. Chassis according to claim 5, wherein the means for fixing the stiffening cross member to the lower longitudinal side of the heel board cross member are screws or angle brackets.

7. Chassis according to claim 1, wherein the rear floor part comprises a panel, affixed to the upper longitudinal side of the heel board cross member and on which is affixed a first pair of supports for seat slides, and at least one load panel, on which is affixed a second pair of supports for seat slides.

8. Motor vehicle comprising a chassis according to claim 1, wherein the motor vehicle is of the station wagon type.

9. Chassis according to claim 2, wherein the cross member has at least one recess adapted to ensure the passage of at least one element, between said cross member and the floor.

10. Chassis according to claim 2, wherein the means for fixing the stiffening cross member to the lower longitudinal side of the heel board cross member and to the lateral longitudinal members, respectively, are removable.

11. Chassis according to claim 2, wherein the means for fixing the stiffening cross member to the lower longitudinal side of the heel board cross member are screws or angle brackets.

12. Chassis according to claim 2, wherein the rear floor part comprises a panel, affixed to the upper longitudinal side of the heel board cross member and on which is affixed a first pair of supports for seat slides, and at least one load panel, on which is affixed a second pair of supports for seat slides.

13. Motor vehicle comprising a chassis according to claim 2, wherein the motor vehicle is of the station wagon type.

14. Chassis according to claim 3, wherein the cross member has at least one recess adapted to ensure the passage of at least one element, between said cross member and the floor.

15. Chassis according claim 3, wherein the means for fixing the stiffening cross member to the lower longitudinal side of the heel board cross member and to the lateral longitudinal members, respectively, are removable.

16. Chassis according to claim 3, wherein the means for fixing the stiffening cross member to the lower longitudinal side of the heel board cross member are screws or angle brackets.

17. Chassis according to claim 3, wherein the rear floor part comprises a panel, affixed to the upper longitudinal side of the heel board cross member and on which is affixed a first pair of supports for seat slides, and at least one load panel, on which is affixed a second pair of supports for seat slides.

18. Motor vehicle comprising a chassis according to claim 3, wherein the motor vehicle is of the station wagon type.

* * * * *